(12) United States Patent
Maruyama (10) Patent No.: US 8,950,875 B2
(45) Date of Patent: Feb. 10, 2015

(54) PROJECTOR THAT ACQUIRES LENS ADJUSTMENT VALUES CORRESPONDING TO TYPE OF INPUT TERMINAL SELECTED, AND CONTROL METHOD THEREOF

(75) Inventor: Shunji Maruyama, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 336 days.

(21) Appl. No.: 13/415,133

(22) Filed: Mar. 8, 2012

(65) Prior Publication Data

US 2012/0236271 A1    Sep. 20, 2012

(30) Foreign Application Priority Data

Mar. 15, 2011    (JP) ................................. 2011-056262

(51) Int. Cl.

| G03B 21/14 | (2006.01) |
| H04N 5/46 | (2006.01) |
| H04N 5/262 | (2006.01) |
| H04N 21/2343 | (2011.01) |
| G03B 21/53 | (2006.01) |
| H04N 9/31 | (2006.01) |

(52) U.S. Cl.
CPC ............ *G03B 21/142* (2013.01); *H04N 5/2628* (2013.01); *H04N 21/234372* (2013.01); *G03B 21/53* (2013.01); *H04N 9/317* (2013.01); *G03B 2205/0046* (2013.01)
USPC ........... 353/101; 353/121; 345/667; 345/682; 348/445; 348/556

(58) Field of Classification Search
CPC ................ H04N 9/317; H04N 5/2628; H04N 21/234372; G03B 21/142; G03B 21/53; G03B 2205/0046
USPC .................. 353/101, 121; 345/667, 682, 745; 348/445, 556
See application file for complete search history.

(56) References Cited

U.S. PATENT DOCUMENTS

| 2004/0021799 A1* | 2/2004 | Matsuda ....................... 348/744 |
| 2006/0203133 A1 | 9/2006 | Fujiwara |
| 2007/0052733 A1 | 3/2007 | Hirabayashi et al. |
| 2010/0146429 A1 | 6/2010 | Fujiwara |
| 2011/0157487 A1* | 6/2011 | Akeyama ....................... 348/759 |
| 2012/0236270 A1 | 9/2012 | Maruyama |

(Continued)

FOREIGN PATENT DOCUMENTS

| JP | 2003-295321 A | 10/2003 |
| JP | 2006-276492 A | 10/2006 |

(Continued)

*Primary Examiner* — Georgia Y Epps
*Assistant Examiner* — Magda Cruz
(74) *Attorney, Agent, or Firm* — ALG Intellectual Property, LLC (57) ABSTRACT

A projector includes a lens adjustment mechanism that performs a predetermined adjustment operation for a projection lens, an input selection unit that selects one input terminal from plurality of input terminals provided in the input terminal unit according to a predetermined operation, an adjustment value storage unit that stores lens adjustment values by linking to the type of the input terminal, an adjustment value acquisition unit that acquires, from the adjustment value storage unit, the lens adjustment values corresponding to the type of the selected input terminal when the predetermined operation is received, and an adjustment control unit that causes the lens adjustment mechanism to perform a lens adjustment operation based on the acquired lens adjustment values.

16 Claims, 4 Drawing Sheets

(56) References Cited

U.S. PATENT DOCUMENTS

2012/0320007 A1  12/2012  Fujiwara
2013/0215135 A1  8/2013  Hirabayashi et al.

FOREIGN PATENT DOCUMENTS

JP   2007-072150 A   3/2007
JP   2009-058965 A   3/2009

* cited by examiner

FIG. 1

(ADJUSTMENT VALUE STORAGE UNIT)

| INPUT TERMINAL TYPE | FOCUS ADJUSTMENT VALUE | ZOOM ADJUSTMENT VALUE | LENS SHIFT ADJUSTMENT VALUE |
|---|---|---|---|
| COMPUTER 1 | 10 | 20 | 15 |
| COMPUTER 2 | 10 | 20 | 15 |
| S-VIDEO | 12 | 17 | 14 |
| VIDEO | 12 | 17 | 14 |
| HDMI | 15 | 15 | 13 |

PROJECTOR THAT ACQUIRES LENS ADJUSTMENT VALUES CORRESPONDING TO TYPE OF INPUT TERMINAL SELECTED, AND CONTROL METHOD THEREOF

BACKGROUND

1. Technical Field

The present invention relates to a projector, and a control method thereof.

2. Related Art

In recent years, a projector which includes an adjustment mechanism of an optical system (lens) such as zooming, focusing, lens-shifting, or the like has become known. JP-A-2003-295321 discloses a projector controller in which a plurality of sets of parameters (lens adjustment values) for adjusting the optical system including zooming, focusing, lens-shifting, or the like are stored in a memory, a desired set of parameters is selected therefrom, and the optical system is adjusted according to each parameter of the selected set of parameters. A projector of such a type is advantageous in a case where the projector is fixedly installed, and a plurality of screens are used by being switched according to an input terminal selected from a plurality of input terminals. In other words, it is possible to correct deviation of display positions caused by switching of the screens in such a way that sets of parameters are changed to adjust the lens positions.

However, in the projector of the related art, there was a case where it was not possible to ascertain lens adjustment values (sets of parameters) stored in the memory. In other words, it was necessary for a user to memorize what lens adjustment values had been stored in the memory, and the user had to select the lens adjustment values (sets of parameters) stored in the memory according to the selected input terminal. However, since it was difficult for the user to memorize the lens adjustment values, a projector has been demanded which can perform the adjustment of the optical system by selecting the lens adjustment values with ease.

SUMMARY

An advantage of some aspects of the invention is to solve at least part of the above-described problem, and the invention can be implemented as the following forms or application examples.

An application example of the invention is directed to a projector including a light source, a light modulation device that modulates light emitted from the light source into image light according to an image signal, a projection lens that projects the image light modulated by the light modulation device, a lens adjustment mechanism that performs a predetermined adjustment operation for the projection lens, an input terminal unit that includes a plurality of input terminals into which the image signal is input, an operation reception unit that receives a predetermined operation, an input selection unit that selects one input terminal from the plurality of input terminals provided in the input terminal unit according to the predetermined operation that the operation reception unit receives, an adjustment value storage unit that stores lens adjustment values for adjusting the lens adjustment mechanism by linking to the types of the input terminals, an adjustment value acquisition unit that acquires, from the adjustment value storage unit, the lens adjustment values corresponding to the type of the input terminal selected by the input selection unit when the operation reception unit receives the predetermined operation and an adjustment control unit that causes the lens adjustment mechanism to perform a lens adjustment operation based on the lens adjustment values acquired by the adjustment value acquisition unit.

According to the projector as above, the lens adjustment mechanism performs an adjustment operation for the projection lens. The adjustment value storage unit stores the lens adjustment values by linking to the types of the input terminals. The adjustment value acquisition unit acquires, from the adjustment value storage unit, the lens adjustment values corresponding to the type of the selected input terminal when the predetermined operation is received. In addition, the adjustment control unit causes the lens adjustment mechanism to perform a lens adjustment operation based on the acquired lens adjustment values. Accordingly, since the projector performs the lens adjustment operation corresponding to the type of the selected input terminal with the predetermined operation by a user, it is possible to simplify a user operation for lens adjustment.

In the projector described above, the predetermined adjustment operation may be at least one of the focus adjustment operation, the zoom adjustment operation, and the lens shift adjustment operation. Accordingly, since the projector performs the focus adjustment operation, the zoom adjustment operation, and the lens shift adjustment operation based on the lens adjustment values corresponding to the type of the selected input terminal with the predetermined operation by the user, it is possible to simplify a user operation for lens adjustment.

According to this configuration, the predetermined operation is an operation for selecting an input terminal. Accordingly, when an input terminal is switched, the projector performs the lens adjustment operation corresponding to the type of the selected input terminal. Therefore, it is possible to perform lens adjustment according to the type of the selected input terminal without causing the awareness of the user.

In the projector described above, the predetermined operation may be a power input operation of the projector. Accordingly, when power is input to the projector, the projector performs the lens adjustment operation corresponding to the type of the selected input terminal. Therefore, it is possible to perform lens adjustment according to the type of the input terminal without causing the awareness of the user.

In the projector described above, the input terminal that the input selection unit selects may be the input terminal selected when the power supply was disconnected previously. Accordingly, when power is input to the projector, the projector performs a lens adjustment operation corresponding to the type of the input terminal that was selected when the power supply was disconnected previously. Therefore, it is possible to perform lens adjustment according to the type of the input terminal without causing the awareness of the user.

In the projector described above, the storage control unit may cause the adjustment value storage unit to store the lens adjustment values by linking to the type of the input terminal selected by the input selection unit at the time when the lens adjustment values are stored in the adjustment value storage unit. Accordingly, since the lens adjustment values are stored by being linked to the type of the input terminal that is subjected to adjustment, the user can perform an adjustment operation without confusion.

The projector described above may further include a storage control unit which receives the selection of the input terminal, and causes the adjustment value storage unit to store the lens adjustment values by linking to the type of the selected input terminal. Accordingly, since it is possible to cause the lens adjustment values to be stored by being linked to the type of the desired input terminal, the convenience of the user improves.

Another application example of the invention is directed to a control method of a projector. In the control method, the projector performs the lens adjustment operation corresponding to the type of the selected input terminal with the predetermined operation by the user, and therefore it is possible to simplify a user operation for lens adjustment.

When the projector and the control method thereof are established using a computer provided in the projector, the above-described forms and application examples can be configured in the form of a program for realizing the functions thereof or a recording medium in which the program is recorded to be readable by the computer. As the recording medium, it is possible to use various media that are readable by the computer, including a flexible disk, a hard disk, a CD-ROM (Compact Disc Read Only Memory), a DVD (Digital Versatile Disc), a Blu-ray Disc (registered trademark), a magneto-optical disc, a non-volatile memory card, an internal storage device (a semiconductor memory including a RAM (Random Access Memory), a ROM (Read Only Memory), or the like) of the projector, an external storage device (a USB (Universal Serial Bus) memory, or the like), and the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment will be described.

Embodiment

In the embodiment, a projector will be described which performs a lens adjustment operation based on lens adjustment values according to the kind of an input terminal selected when a predetermined operation is received.

Figure 1:
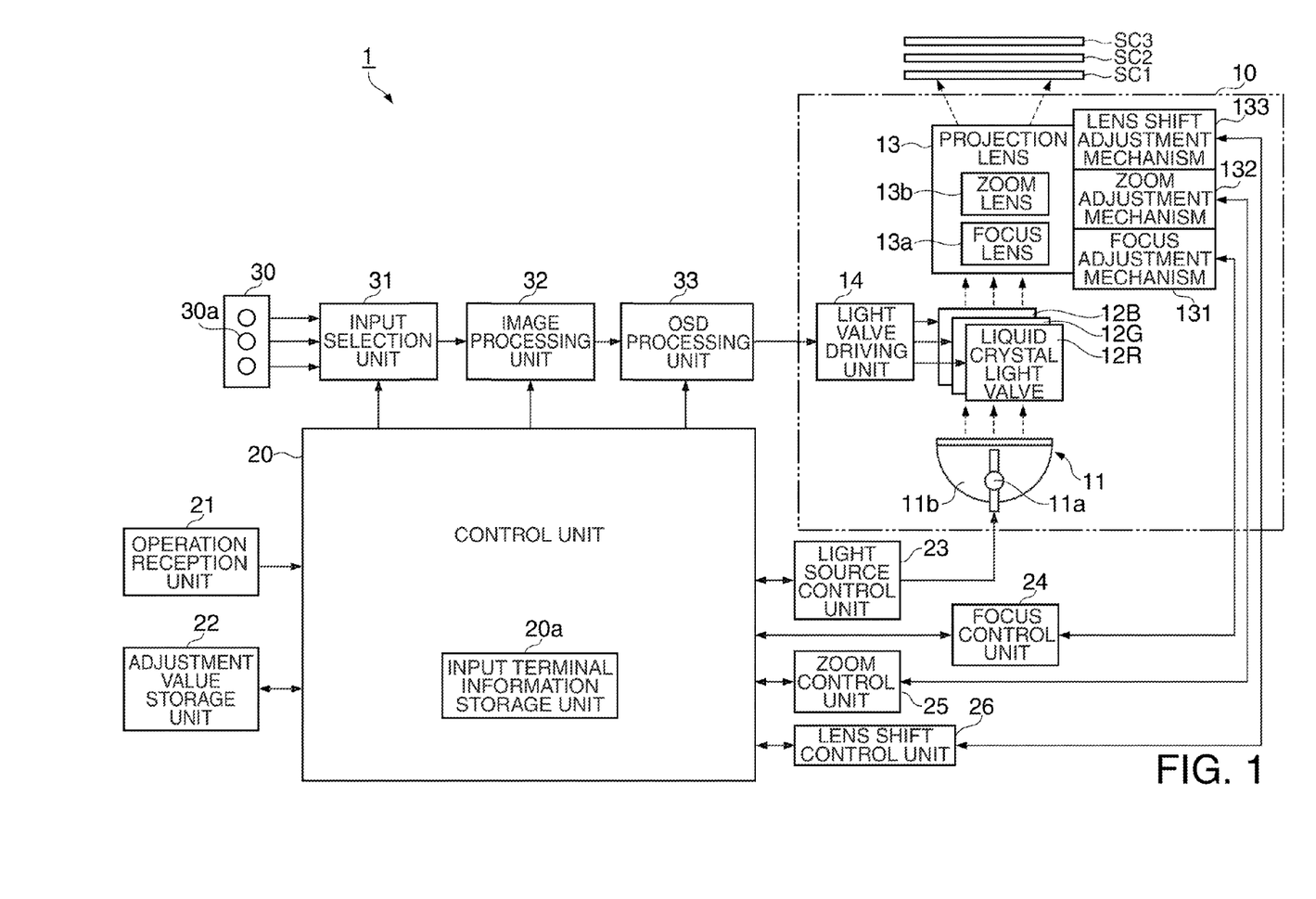
FIG. 1 is a block diagram showing a schematic configuration of a projector according to an embodiment.

FIG. 1 is a block diagram showing a schematic configuration of the projector according to the embodiment. The internal configuration of the projector 1 will be described with reference to FIG. 1.

The projector 1 includes an image projection unit 10, a control unit 20, an operation reception unit 21, an adjustment value storage unit 22, a light source control unit 23, a focus control unit 24, a zoom control unit 25, a lens shift control unit 26, an input terminal unit 30, an input selection unit 31, an image processing unit 32, an OSD (On-Screen Display) processing unit 33, and the like.

The image projection unit 10 includes a light source 11, three liquid crystal light valves 12R, 12G, and 12B as light modulators, a projection lens 13 as a projection optical system, a light valve driving unit 14, a focus adjustment mechanism 131, a zoom adjustment mechanism 132, a lens shift adjustment mechanism 133, and the like. The image projection unit 10 forms image light by causing light emitted from the light source 11 to be modulated in the liquid crystal light valves 12R, 12G, and 12B, then projects the image light from the projection lens 13, and causes an image to be displayed on screens SC1, SC2, or SC3. Herein, in the embodiment, the screen SC1 is set to be a screen for images output from a computer, the screen SC2 is set to be a screen for video images, and the screen SC3 is set to be a screen for HDMI (High-Definition Multimedia Interface) images.

The light source 11 is configured to include a discharge type light source lamp 11a including an extra-high-pressure mercury lamp, a metal halide lamp, and the like, and a reflector 11b which reflects light radiated from the light source lamp 11a to the liquid crystal light valves 12R, 12G, and 12B side. Light emitted from the light source 11 is converted to light having substantially uniform luminance distribution by an integrator optical system which is not shown in the drawing, separated into each colored light component of three colors of light including red R, green G, and blue B by a color separation optical system that is not shown in the drawing, and respectively incident to the liquid crystal light valves 12R, 12G, and 12B.

The liquid crystal light valves 12R, 12G, and 12B are constituted by liquid crystal panels formed by injecting liquid crystal in between a pair of transparent substrates. In the liquid crystal light valves 12R, 12G, and 12B, a plurality of pixels (not shown in the drawing) that are arranged in a matrix shape are formed, and a driving voltage can be applied to the liquid crystal for each pixel. If the light valve driving unit 14 applies a driving voltage to each pixel according to input image information, each pixel is set to have an optical transmittance according to the image information. For this reason, the light emitted from the light source 11 is modulated after transmitting through the liquid crystal light valves 12R, 12G, and 12B, and images according to the image information are formed for each colored light beam. Formed images of each color are synthesized for each pixel by a color synthesizing optical system that is not shown in the drawing so as to become a color image, and the image is projected from the projection lens 13.

The projection lens 13 has a focus lens 13a, and enables focusing (focus adjustment) by moving the position of the focus lens 13. In addition, the projection lens 13 has a zoom lens 13b, and enables the adjustment of a projection view angle by changing a zooming state.

The focus adjustment mechanism 131 is constituted by a motor, a gear, and the like, drives (moves) the focus lens 13a, and performs focus adjustment based on the control of the focus control unit 24. In addition, the focus adjustment mechanism 131 detects the position of the focus lens 13a as a focus adjustment value (focus amount). Then, the focus adjustment mechanism 131 outputs the focus adjustment value that is the detection result to the focus control unit 24. In the embodiment, as a method for detecting the focus adjustment value, the amount of change of the position of the focus lens 13a is detected by an encoder, or the like. As another method for detecting the focus adjustment value, the motor of the focus adjustment mechanism 131 may be set to be a stepping motor so as to detect the value based on the number of steps of the stepping motor.

The zoom adjustment mechanism 132 is constituted by a motor, a gear, and the like, drives (moves) the zoom lens 13b, and performs zoom adjustment based on the control of the zoom control unit 25. In addition, the zoom adjustment mechanism 132 detects the zooming state of the zoom lens 13b as a zoom adjustment value (zoom amount). Then, the zoom adjustment mechanism 132 outputs the zoom adjustment value that is the detection result to the zoom control unit 25. In the embodiment, as a method for detecting the zoom adjustment value, the amount of change of the zooming state of the zoom lens 13b is detected by an encoder, or the like. Furthermore, as another method for detecting the zoom adjustment value, the motor of the zoom adjustment mechanism 132 may be set to be a stepping motor so as to detect the value based on the number of steps of the stepping motor.

The lens shift adjustment mechanism 133 is constituted by a motor, a gear, and the like that cause the projection lens 13 to move, causes the projection lens 13 to move based on the control of the lens shift control unit 26, and accordingly changes the projection position of the projection image. In addition, the lens shift adjustment mechanism 133 detects a lens shift state of the projection lens 13 as a lens shift adjustment value (lens shift amount). Then, the lens shift adjustment mechanism 133 outputs the lens shift adjustment value that is the detection result to the lens shift control unit 26. In the embodiment, as a method for detecting the lens shift adjustment value, the amount of change of the position of the projection lens 13 is detected by an encoder, or the like. Furthermore, as another method for detecting the lens shift adjustment value, the motor of the lens shift adjustment mechanism 133 may be set to a stepping motor so as to detect the value based on the number of steps of the stepping motor.

The focus adjustment mechanism 131, zoom adjustment mechanism 132, and lens shift adjustment mechanism 133 correspond to a lens adjustment mechanism.

The control unit 20 includes a CPU (Central Processing Unit), a RAM which is used for temporarily storing various data, a non-volatile memory such as a mask ROM or a flash memory, a FeRAM (Ferroelectric RAM: Ferroelectric Random Access Memory), and the like (none of which are shown in the drawing), and functions as a computer. The control unit 20 controls the overall operation of the projector 1 by the operation of the CPU according to a control program stored in the non-volatile memory. In addition, the control unit 20 includes an input terminal information storage unit 20a that stores information on the types of selected input terminals. The input terminal information storage unit 20a includes the non-volatile memory, and secures information even when the power of the projector 1 is off.

The operation reception unit 21 receives an input operation from a user, and includes a plurality of operation keys used by the user to give various instructions to the projector 1. As the operation keys included in the operation reception unit 21, there are a power supply key for switching power on or off, an input switching key for switching an input image signal, a focus adjustment key for performing focus adjustment, a zoom adjustment key for performing zoom adjustment, a lens shift adjustment key for performing lens shift adjustment, a menu key for switching between display or non-display of the menu screen used for various settings, a cursor key used for moving the cursor on the menu screen, or the like, a decision key for deciding various settings, and the like. If the user operates (presses down) various operation keys of the operation reception unit 21, the operation reception unit 21 receives the input operation, and outputs an operation signal to the control unit 20 in accordance with the operation details of the user.

Furthermore, as the operation reception unit 21, using a remote controller (not shown in the drawing) that enables a remote operation may be configured. In this case, the remote controller sends an operation signal such as infrared rays in accordance with the operation details of the user, and a remote controller signal reception unit that is not shown in the drawing receives the signal to transmit to the control unit 20.

The adjustment value storage unit 22 includes a non-volatile memory, and stores focus adjustment values, zoom adjustment values, and lens shift adjustment values corresponding to the types of input terminals. The control unit 20 takes charge of writing the focus adjustment values, the zoom adjustment values, and the lens shift adjustment values into the adjustment value storage unit 22. In addition, the control unit 20 reads the stored focus adjustment values, zoom adjustment values, and lens shift adjustment values.

Figure 2:
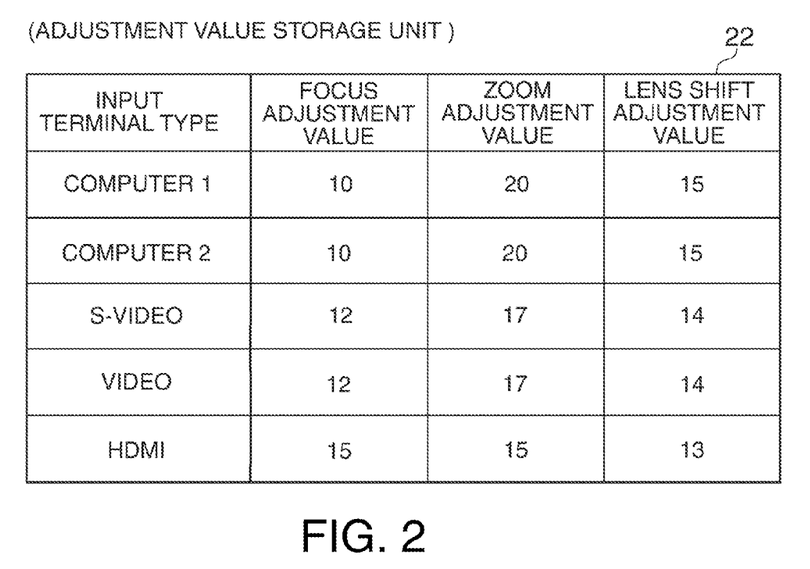
FIG. 2 is a descriptive diagram of an adjustment value storage unit.

Herein, the adjustment value storage unit 22 will be described.

FIG. 2 is a descriptive diagram of the adjustment value storage unit 22. As shown in FIG. 2, the adjustment value storage unit 22 stores the focus adjustment values, the zoom adjustment values, and the lens shift adjustment values as lens adjustment values corresponding to the types of the input terminals. As the input terminals, the projector 1 of the embodiment includes "computer 1", "computer 2", "S-video", "video", and "HDMI". In addition, the focus adjustment values, the zoom adjustment values, and the lens shift adjustment values are stored corresponding to each of the input terminals. Furthermore, the input terminals are not limited to the above, and may include a plurality of other input terminals. In addition, the adjustment value storage unit 22 may store lens adjustment values corresponding to the above input terminals.

Figure 3:
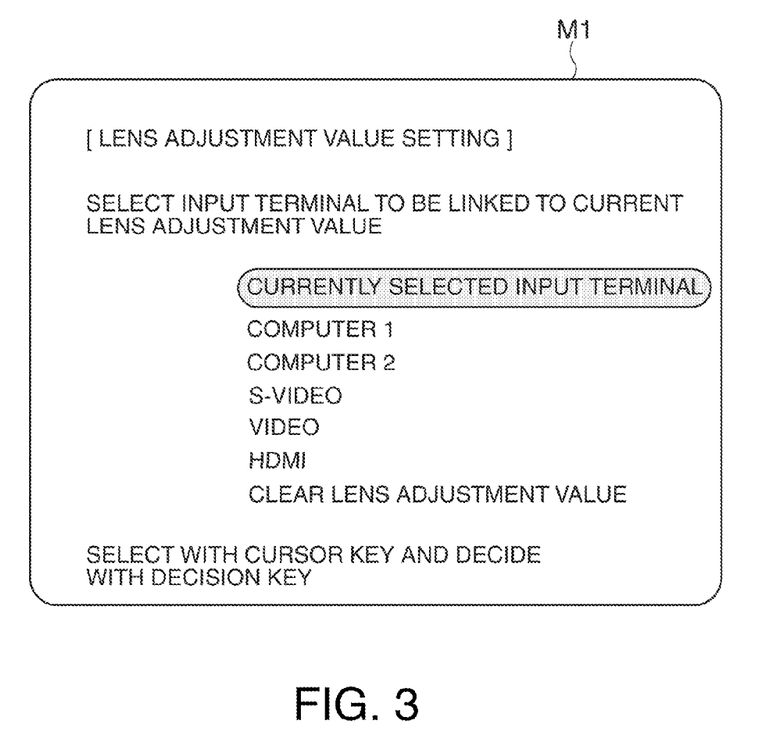
FIG. 3 is a descriptive diagram of a lens adjustment value setting screen for setting lens adjustment values linked to input terminals.

Herein, a setting screen for causing the adjustment value storage unit 22 to store the lens adjustment values linked to the input terminals will be described.

FIG. 3 is a descriptive diagram of a setting screen of the lens adjustment values for setting the lens adjustment values linked to the input terminals. A lens adjustment value setting screen M1 is displayed in such a way that the user presses down the menu key provided in the operation reception unit 21 to perform a specific operation. In the embodiment, the lens adjustment value setting screen M1 is set to be an OSK display, and is caused to be displayed by the control unit 20 giving an instruction to an OSD processing unit 33 to be described later.

As shown in FIG. 3, in the uppermost part of the lens adjustment value setting screen M1, the character array of "lens adjustment value setting" indicating a lens adjustment value setting screen is displayed. Below the character array, another character array of "Please select an input terminal to be linked to the current lens adjustment value" that encourages selection of the input terminal to be linked to the lens adjustment values is displayed. Furthermore, in the center of the screen, options of "currently selected input terminal", "computer 1", "computer 2", "S-video", "video", "HDMI", and "clear lens adjustment value" are displayed. In addition, in the lower part of the screen, explanation of a key input procedure is displayed.

If the user operates the operation reception unit 21, selects the "currently selected input terminal", "computer 1", "computer 2", "S-video", "video", or "HDMI" on the screen, and makes a decision with the decision key, the control unit 20 forms a link of the current lens adjustment values (focus adjustment values, zoom adjustment values, and lens shift adjustment values) to the selected input terminal, and causes the adjustment value storage unit 22 to write and store the result. The operation reception unit 21 and the control unit 20 at this time correspond to a storage control unit. Herein, the "currently selected input terminal" is an input terminal that is currently selected and stored in the input terminal information storage unit 20a. Furthermore, in the embodiment, the default of the options is set to the "currently selected input terminal". In addition, if the "clear lens adjustment value" is selected, the control unit 20 deletes (clears) all lens adjustment values stored in the adjustment value storage unit 22. In other words, a state is set in which lens adjustment values are not stored. Furthermore, the lens adjustment values stored in the adjustment value storage unit 22 may be set to be deleted (cleared) for each input terminal. For example, it is possible that a screen (not shown in the drawing) for deleting lens adjustment values is displayed, an input terminal is selected by the user, and lens adjustment values linked to the selected input terminal are deleted.

Returning to FIG. 1, the light source control unit 23 includes an inverter (not shown in the drawing) that converts a DC current generated in a power source circuit (not shown in the drawing) into an AC rectangular wave current, an igniter (not shown in the drawing) that prompts the start of the light source lamp 11a by performing insulation breakdown between electrodes of the light source lamp 11a, and controls turning-on of the light source 11 based on an instruction of the control unit 20. Specifically, the light source control unit 23 can cause the light source 11 to turn on by starting the light source 11 and supplying predetermined electric power, and cause the light source 11 to turn off by stopping supply of power. In addition, the light source control unit 23 can adjust luminance (brightness) of the light source 11 by controlling power supplied to the light source 11 based on an instruction of the control unit 20.

The focus control unit 24 causes the focus lens 13a to move by controlling the focus adjustment mechanism 131 based on an instruction of the control unit 20 to perform focus adjustment. In addition, the focus control unit 24 inputs focus adjustment values from the focus adjustment mechanism 131 and outputs the values to the control unit 20.

The zoom control unit 25 causes the zoom lens 13b to move by controlling the zoom adjustment mechanism 132 based on an instruction of the control unit 20 to perform zoom adjustment. In addition, the zoom control unit 25 inputs zoom adjustment values from the zoom adjustment mechanism 132 and outputs the values to the control unit 20.

The lens shift control unit 26 causes the projection lens 13 to move by controlling the lens shift adjustment mechanism 133 based on an instruction of the control unit 20 to perform lens shift adjustment. In addition, the lens shift control unit 26 inputs lens shift adjustment values from the lens shift adjustment mechanism 133 and outputs the values to the control unit 20.

The input terminal unit 30 includes a plurality of input terminals 30a that can input image signals in various forms from external image supply devices that are not shown in the drawing, such as a personal computer, a video reproduction device, a memory card, a USB storage, a digital camera, or the like. Image signals input to each input terminal 30a are supplied to the input selection unit 31.

The input selection unit 31 selects one input terminal 30a among the plurality of input terminals 30a based on an instruction of the control unit 20, converts image signals input to the input terminal 30a into image information in a form that can be processed by the image processing unit 32, and outputs the information to the image processing unit 32. If the user designates a desired input terminal 30a by operating input switch keys provided in the operation reception unit 21, the control unit 20 instructs the input selection unit 31 so that the image signals input to the input terminal 30a are output to the image processing unit 32. Furthermore, the user can also select an input terminal 30a into which the image signals are not input, and if the image signals are input to the input terminal 30a that is selected based on the instruction of the control unit 20, the input selection unit 31 converts the signals into image information in a form that can be processed by the image processing unit 32 and outputs the information to the image processing unit 32.

The image processing unit 32 converts the image information input from the input selection unit 31 into image data indicating the grayscale of each pixel of the liquid crystal light valves 12R, 12G, and 12B. Herein, the converted image data is constituted by separate colored light of R, G, and B, and includes a plurality of pixel values corresponding to the entire pixels of each of the liquid crystal light valves 12R, 12G, and 12B. The pixel values are for determining an optical transmittance of corresponding pixels, and the pixel values are used to regulate the intensity (grayscale) of light emitted from each pixel. In addition, the image processing unit 32 performs an image quality adjustment process for adjusting brightness, contrast, sharpness, hue, and the like for the converted image data based on an instruction of the control unit 20, and outputs the processed image data to the OSD processing unit 33.

The OSD processing unit 33 performs a process of overlapping an OSD image of the menu screen, a message screen, or the like over the image data input from the image processing unit 32 based on an instruction of the control unit 20. The OSD processing unit 33 includes an OSD memory that is not shown in the drawing, and stores OSD image data indicating graphics, fonts, and the like for forming an OSD image. If the control unit 20 instructs overlapping of the OSD image, the OSD processing unit 33 reads necessary OSD image data from the OSD memory, and synthesizes the OSD image data with the image data input from the image processing unit 32 so that the OSD image is overlapped at a predetermined position of the input image. The image data synthesized with the OSD image data is output to the light valve driving unit 14. Furthermore, when there is no instruction from the control unit 20 to overlap the OSD image, the OSD processing unit 33 outputs the image data output from the image processing unit 32 to the light valve driving unit 14 without change.

When the light valve driving unit 14 drives the liquid crystal light valves 12R, 12G, and 12B in accordance with the image data input from the OSD processing unit 33, the liquid crystal light valves 12R, 12G, and 12B form an image according to the image data, and the image is projected from the projection lens 13.

Next, a lens adjustment operation performed by the projector 1 when the operation reception unit 21 receives an input switch operation or a power input operation as a predetermined operation will be described. Herein, the input switch operation refers to an operation in which the user presses down the input switch key provided in the operation reception unit 21 in the middle of image projection performed by the projector 1, and the control unit 20 sends an instruction to the input selection unit 31 to switch the input terminal 30a. In addition, the power input operation refers to an operation in which the power supply key provided in the operation reception unit 21 is pressed down, and the power supply of the projector 1 is on due to an instruction of the control unit 20 to start image projection.

Figure 4:
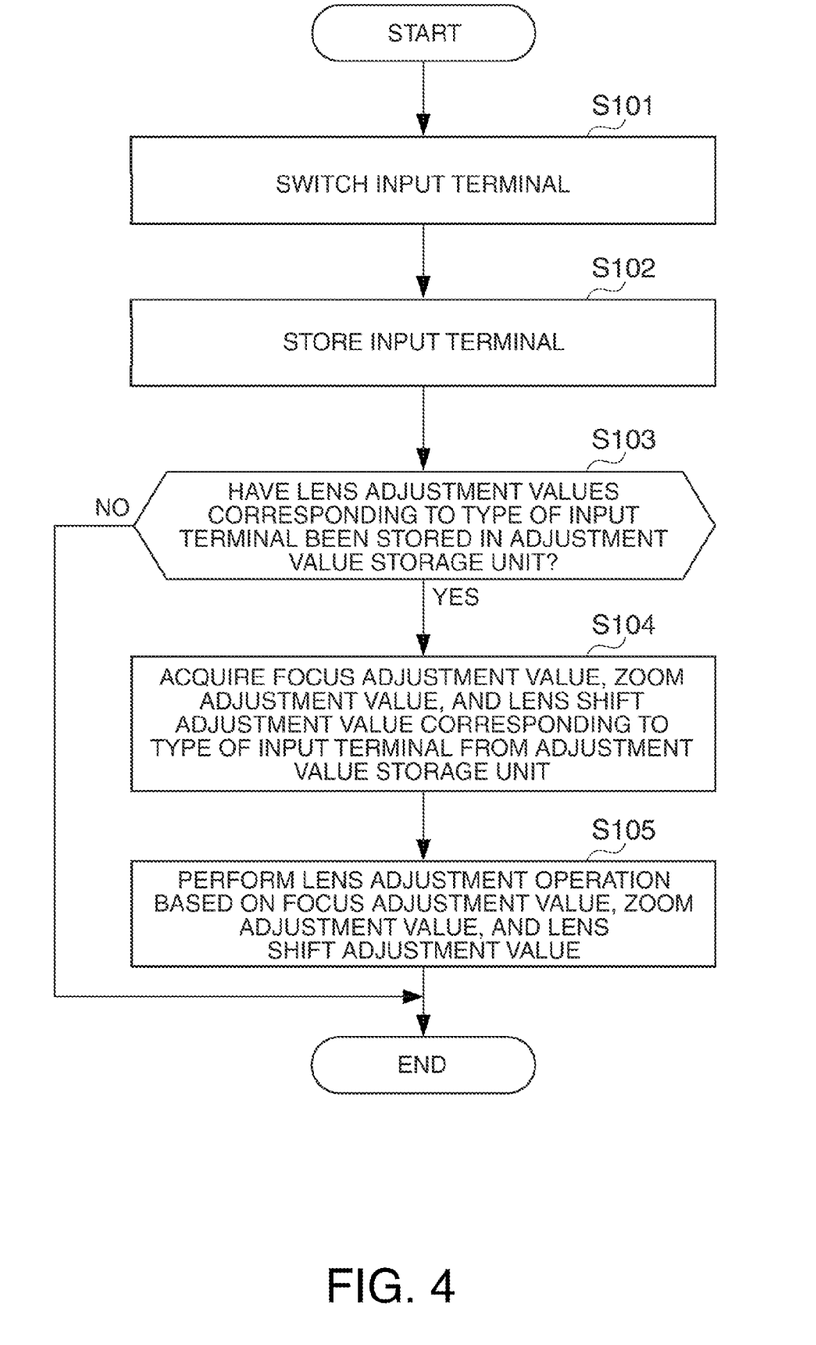
FIG. 4 is a flowchart of a lens adjustment process performed when the projector receives an input switch operation.

FIG. 4 is a flowchart of a lens adjustment process performed when the projector 1 receives the input switch operation. The lens adjustment process during the input switch operation will be described with reference to FIG. 4.

When the operation reception unit 21 receives the input switch operation, the control unit 20 causes the input selection unit 31 to switch the input terminal 30a based on the input switch operation (Step S101). Furthermore, the input switch operation may be an operation by the user to select an input terminal, or an operation for automatically searching for and selecting an input terminal into which signals are input. In addition, the control unit 20 causes the input terminal information storage unit 20a to store information on the switched input terminal 30a (Step S102). Then, the control unit 20 determines whether or not the adjustment value storage unit 22 has stored lens adjustment values corresponding to the type of the input terminal 30a (Step S103).

When the lens adjustment values have been stored (Step S103: YES), the control unit 20 acquires a focus adjustment value, a zoom adjustment value, and a lens shift adjustment value corresponding to the type of the input terminal 30a from the adjustment value storage unit 22 (Step S104). The control unit 20 at this time corresponds to an adjustment value acquisition unit. Then, the control unit 20 sends an instruction to the focus control unit 24, the zoom control unit 25, and the lens shift control unit 26, and causes a lens adjustment operation according to the focus adjustment value, the zoom adjustment value, and the lens shift adjustment value (Step S105). In other words, the focus control unit 24 performs focus adjustment so as to attain the acquired focus adjustment value, the zoom control unit 25 performs zoom adjustment so as to attain the acquired zoom adjustment value, and the lens shift control unit 26 performs lens shift adjustment so as to attain the acquired lens shift adjustment value. The control unit 20, the focus control unit 24, the zoom control unit 25, and the lens shift control unit 26 at this time correspond to an adjustment control unit. Then, the lens adjustment process performed when the projector 1 receives the input switch operation ends.

When the lens adjustment values have not been stored (Step S103: NO), the lens adjustment operation is not performed, and the lens adjustment process performed when the projector 1 receives the input switch operation ends.

Figure 5:
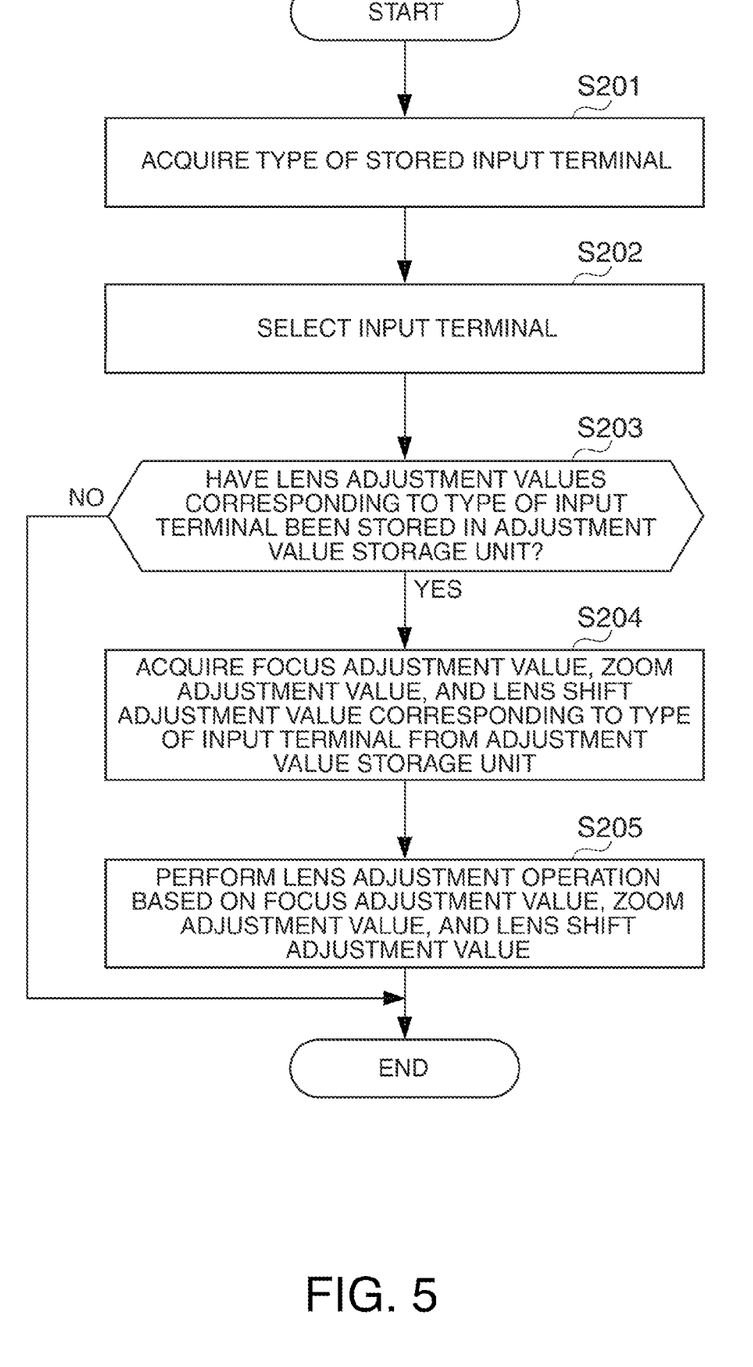
FIG. 5 is a flowchart of a lens adjustment process performed when the projector receives a power input operation.

FIG. 5 is a flowchart of a lens adjustment process performed when the projector 1 receives a power input operation. The lens adjustment process during the power input operation will be described with reference to FIG. 5.

When the operation reception unit 21 receives the power input operation, the control unit 20 acquires information on the type of the input terminal 30a stored in the input terminal information storage unit 20a (Step S201). The control unit 20 causes the input selection unit 31 to select the input terminal 30a based on the information on the type of the input terminal 30a (Step S202). Then, the control unit 20 determines whether or not the adjustment value storage unit 22 has stored lens adjustment values corresponding to the type of the input terminal 30a (Step S203).

When the lens adjustment values have been stored (Step S203: YES), the control unit 20 acquires a focus adjustment value, a zoom adjustment value, and a lens shift adjustment value corresponding to the type of the input terminal 30a from the adjustment value storage unit 22 (Step S204). Then, the control unit 20 sends an instruction to the focus control unit 24, the zoom control unit 25, and the lens shift control unit 26, and causes a lens adjustment operation according to the focus adjustment value, the zoom adjustment value, and the lens shift adjustment value (Step S205). Then, the lens adjustment process performed when the projector 1 receives the power input operation ends.

When the lens adjustment values have not been stored (Step S203: NO), the lens adjustment operation is not performed, and the lens adjustment process performed when the projector 1 receives the power input operation ends.

As described above, when the input switch operation or the power input operation is received, the projector 1 performs the lens adjustment operation based on the focus adjustment value, the zoom adjustment time value, and the lens shift adjustment value corresponding to the selected input terminal 30a.

According to the above-described embodiment, the following effects are obtained.

(1) When the input switch operation is received, the projector 1 acquires the focus adjustment value, the zoom adjustment value, and the lens shift adjustment value according to the type of the switched input terminal 30a from the adjustment value storage unit 22. Then, the control unit 20 sends an instruction to the focus control unit 24, the zoom control unit 25, and the lens shift control unit 26, and causes the lens adjustment operation according to the focus adjustment value, the zoom adjustment value, and the lens shift adjustment value. Accordingly, since the projector 1 performs the lens adjustment operation corresponding to the type of the selected input terminal 30a with the input switch operation by the user, it is not necessary for the user to perform an operation for lens adjustment. In other words, when the input terminal 30a is changed and switching is performed to a screen (SC1, SC2, or SC3) corresponding to the input terminal 30a, the lens adjustment operation may not be performed. Therefore, it is possible to simplify a user operation. In addition, it is possible to shorten the time for lens adjustment.

(2) When the poser input operation is received, the projector 1 acquires, from the adjustment value storage unit 22, the focus adjustment value, the zoom adjustment value, and the lens shift adjustment value corresponding to the type of the input terminal 30a stored in the input terminal information storage unit 20a, that is, the type of the input terminal 30a set when the power supply was disconnected previously. Then, the control unit 20 sends an instruction to the focus control unit 24, the zoom control unit 25, and the lens shift control unit 26, and causes the lens adjustment operation according to the focus adjustment value, the zoom adjustment value, and the lens shift adjustment value. Accordingly, since the projector 1 performs the lens adjustment operation corresponding to the type of the selected input terminal 30a with the power input operation by the user, it is not necessary for the user to perform an operation for lens adjustment. Thus, when a screen (SC1, SC2, or SC3) that was being used when the power supply was off is to be used without change, the lens adjustment operation may not be performed, and therefore, it is possible to simplify a user operation. In addition, it is possible to shorten the time necessary for preparing installation of the projector 1 for projection.

(3) The projector 1 displays the lens adjustment value setting screen M1 and causes the user to select the type of an input terminal 30a. At this time, if "currently selected input terminal" has been selected, the type of the input terminal 30a selected by the input selection unit 31 at that moment is linked to lens adjustment values at that moment and stored in the adjustment value storage unit 22. Accordingly, the user can carry out the lens adjustment work without confusion.

(4) The projector 1 displays the lens adjustment value setting screen M1 and causes the user to select the type of an input terminal 30a. At this time, if "computer 1", "computer 2", "S-video", "video", or "HDMI" is selected, the type of the selected input terminal 30a is linked to the current lens adjustment value, and stored in the adjustment value storage unit 22. Accordingly, since the user, who carries out the lens adjustment work, can cause the type of an arbitrary input terminal 30a to be linked to the lens adjustment values and to be stored, convenience is high.

(5) The projector 1 stores the lens adjustment values (the focus adjustment value, the zoom adjustment value, and the lens shift adjustment value) corresponding to the type of the selected input terminal 30a. Accordingly, the user can use the screens SC1, SC2, or SC3 separately according to input image signals, which enhances convenience.

Furthermore, the invention is not limited to the above-described embodiment, and can be implemented in addition to various modifications, reformation or the like. Modified examples thereof will be described below.

Modified Example 1

In the above embodiment, the adjustment value storage unit 22 is set to store the lens adjustment values of each type of the input terminal 30a, but may store the values by numbering each of the lens adjustment values (combination of the focus adjustment value, the zoom adjustment value, and the lens shift adjustment value). In this case, the adjustment value storage unit 22 stores the numbers of the lens adjustment values linked to each type of the input terminal 30a. In addition, in order to make the numbers correspond to the lens adjustment values, for example, a screen (not shown in the drawings) for storing the numbers of the lens adjustment values is set to be displayed to assist the user in storing the lens adjustment values and the numbers Then, a screen (not shown in the drawings) for selecting the number of a lens adjustment value is set to be displayed, and the user is caused to select the number of the lens adjustment value to acquire the lens adjustment value, thereby being able to perform the lens adjustment operation.

Modified Example 2

In the above embodiment, in the lens adjustment process during the input switch operation, the input terminal 30a is switched and stored in the input terminal information storage unit 20a, the lens adjustment values corresponding to the type of the input terminal 30a are acquired from the adjustment value storage unit 22, and accordingly, the lens adjustment operation is performed. However, the order of the switching process of the input terminal 30a and the process of the lens adjustment operation is not limited thereto, but the switching process of the input terminal 30a and the process of the lens adjustment operation may be performed in parallel. In this case, it is possible to shorten the time taken for the processes. In addition, the switching process of the input terminal 30a may be performed after the process of the lens adjustment operation.

Modified Example 3

In the above embodiment, the input switch operation and the power input operation are described as predetermined operations, but the predetermined operations are not limited thereto, but may be performed as other operations. For example, by having a lens adjustment acquisition key (not shown in the drawings) for acquiring the lens adjustment values and performing the lens adjustment operation, a press-down operation of the lens adjustment acquisition key may be set to the predetermined operation. In this case, the lens adjustment values corresponding to the input terminal 30a selected by the input selection unit 31 when the lens adjustment acquisition key is pressed down are acquired from the adjustment value storage unit 22, and then the lens adjustment operation can be performed.

Modified Example 4

In the above embodiment, the input switch operation, the power input operation, and other key operations are set to be performed by the operation keys provided in the operation reception unit 21, but it is possible that a communication unit (not shown in the drawings) may be provided in the projector 1 so as to receive input switch operation signals, power input operation signals, and other key operation signals through communication from external electric equipment (not shown in the drawings).

Modified Example 5

In the above embodiment, the light source 11 is configured to be a discharge type light source lamp 11a, but a solid-state light source such as an LED (Light Emitting Diode) light source, a laser beam, or the like, or other light sources may also be used.

Modified Example 6

In the above embodiment, as light conversion devices of the projector 1, the transmissive type liquid crystal light valves 12R, 12G, and 12B are used, but a reflective type light conversion device such as a reflective type liquid crystal light valve, or the like can also be used. In addition, a minute mirror array device, or the like, can also be used, which modulates light emitted from a light source by controlling the emission direction of incident light with each micro-mirror as a pixel.

The entire disclosure of Japanese Patent Application No. 2011-56262, filed Mar. 15, 2011 is expressly incorporated by reference herein.

What is claimed is:

1. A projector comprising:
a light source;
a light modulation device that modulates light emitted from the light source into image light according to an image signal;
a projection lens that projects the image light modulated by the light modulation device;
a lens adjustment mechanism that performs a predetermined adjustment operation for the projection lens;
an input terminal unit that includes a plurality of input terminals into which the image signal is input;
an operation reception unit that receives a predetermined operation;
an input selection unit that selects one input terminal from the plurality of input terminals provided in the input terminal unit according to the predetermined operation that the operation reception unit receives;
an adjustment value storage unit that stores lens adjustment values for adjusting the lens adjustment mechanism by linking to the types of the input terminals;
an adjustment value acquisition unit that acquires, from the adjustment value storage unit, the lens adjustment values corresponding to the type of the input terminal selected by the input selection unit when the operation reception unit receives the predetermined operation; and
an adjustment control unit that causes the lens adjustment mechanism to perform a lens adjustment operation based on the lens adjustment values acquired by the adjustment value acquisition unit.

2. The projector according to claim 1, wherein the predetermined adjustment operation by the lens adjustment mechanism is performing at least one of a focus adjustment operation for focusing, a zoom adjustment operation for adjusting a projection view angle, and a lens shift adjustment operation for adjusting the projection position of an image by moving the projection lens.

3. The projector according to claim 1, wherein the predetermined operation that the operation reception unit receives is an operation of causing the input selection unit to select an input terminal.

4. The projector according to claim 1, wherein the predetermined operation that the operation reception unit receives is an operation of power input of the projector.

5. The projector according to claim 4, wherein the input terminal that the input selection unit selects is an input terminal that was selected when the power supply was disconnected previously.

6. The projector according to claim 1, further comprising:
a storage control unit that causes the adjustment value storage unit to store the lens adjustment values by linking to the type of an input terminal,
wherein, when the adjustment value storage unit is caused to store the lens adjustment values, the storage control unit causes the values to be stored by linking to the type of the input terminal selected by the input selection unit at that moment.

7. The projector according to claim 1, further comprising:
a storage control unit that causes the adjustment value storage unit to store the lens adjustment values by linking to the type of an input terminal,
wherein the storage control unit causes the adjustment value storage unit to store the lens adjustment values by linking to the type of the input terminal selected by a selection operation of the input terminal that the operation reception unit receives.

8. The projector according to claim 6,
wherein a received image for selecting the type of the input terminal linked to the lens adjustment values is projected from the projection lens, and
wherein the storage control unit causes the adjustment value storage unit to store the lens adjustment values by linking to the type of the input terminal received from the received image via the operation reception unit.

9. A control method of a projector that includes a light source, a light modulation device that modulates light emitted from the light source into image light according to an image signal, a projection lens that projects the image light modulated by the light modulation device, a lens adjustment mechanism that performs a predetermined adjustment operation for the projection lens, an input terminal unit that includes a plurality of input terminals into which the image signal is input, an input selection unit that selects one input terminal from the plurality of input terminals provided in the input terminal unit, and an adjustment value storage unit that stores lens adjustment values for adjusting the lens adjustment mechanism by linking to the types of the input terminals, the method comprising:
receiving a predetermined operation;
causing the input selection unit to select one input terminal from the plurality of input terminals provided in the input terminal unit according to the predetermined operation received in the receiving;
acquiring, from the adjustment value storage unit, the lens adjustment values corresponding to the type of the input terminal selected by the input selection unit when the predetermined operation is received in the receiving; and
controlling adjustment by causing the lens adjustment mechanism to perform a lens adjustment operation based on the lens adjustment values acquired in the acquiring.

10. The control method of a projector according to claim 9, wherein the lens adjustment mechanism is caused to perform at least one of a focus adjustment operation for focusing, a zoom adjustment operation for adjusting a projection view angle, and a lens shift adjustment operation for adjusting the projection position of an image by moving the projection lens, as the lens adjustment operation.

11. The control method of a projector according to claim 9, wherein an operation for causing the input selection unit to select an input terminal is received as the predetermined operation.

12. The control method of a projector according to claim 9, wherein an operation of power input of the projector is received as the predetermined operation.

13. The control method of a projector according to claim 12, wherein the input terminal that was selected when the power supply was disconnected previously is selected.

14. The control method of a projector according to claim 9, wherein, the adjustment value storage unit is caused to store the lens adjustment values by linking the type of the input terminal selected by the input selection unit at the time when the adjustment value storage unit is caused to store the lens adjustment values.

15. The control method of a projector according to claim 9,
wherein a selection operation of an input terminal is received, and
wherein the adjustment value storage unit is caused to store the lens adjustment values by linking the type of the input terminal selected in the selection operation.

16. The control method of a projector according to claim 14,
wherein a received image for selecting the type of the input terminal linked to the lens adjustment values is projected from the projection lens, and
wherein the adjustment value storage unit is caused to store the lens adjustment values by linking to the type of the input terminal received from the received image.

* * * * *